US007461154B2

(12) United States Patent
Figaro et al.

(10) Patent No.: US 7,461,154 B2
(45) Date of Patent: Dec. 2, 2008

(54) COMMUNICATION ARRANGEMENT BETWEEN VIRTUAL ROUTERS OF A PHYSICAL ROUTER

(75) Inventors: Rodolphe Figaro, Windham, NH (US); David D. Ward, Somerset, WI (US); Anca Zamfir, Kanata (CA); John Galen Scudder, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 710 days.

(21) Appl. No.: 10/992,499

(22) Filed: Nov. 18, 2004

(65) Prior Publication Data

US 2006/0106934 A1    May 18, 2006

(51) Int. Cl.
*G06F 15/16* (2006.01)
(52) U.S. Cl. .................. 709/227; 709/238; 370/235
(58) Field of Classification Search ......... 709/200–202, 709/227, 238; 370/235, 254, 351, 355, 392, 370/400, 401
See application file for complete search history.

(56) References Cited

U.S. PATENT DOCUMENTS

| 6,674,756 | B1 * | 1/2004 | Rao et al. .............. 370/395.21 |
| 7,177,311 | B1 * | 2/2007 | Hussain et al. ............. 370/392 |
| 7,209,976 | B2 * | 4/2007 | Folkes et al. ................ 709/238 |
| 2003/0165144 | A1 * | 9/2003 | Wang .......................... 370/400 |
| 2003/0169747 | A1 * | 9/2003 | Wang .......................... 370/400 |
| 2004/0105388 | A1 * | 6/2004 | Wilkins et al. ............. 370/235 |
| 2006/0031312 | A1 * | 2/2006 | Ellanti et al. ................ 709/206 |

OTHER PUBLICATIONS

Virtual Routing for Provider Edge Applications, IP Infusion White Paper, IP Infusion Inc., 2002.
Virtual Routers: Why, Where and How?, White Paper, Future Software Limited, www.futsoft.com, 2002-2003.
MPLS and the Virtual Router Architecture: Profiting from Traffic Engineering and Network-based Service, White Paper, CoSine Communications, 1998-2002.
Routing Protocols, Feature Guide: Release 6.2, Junos Internet Software for M-series and T-series Routing Platforms, www.juniper.net, Dec. 22, 2003.
Routing Instances, Routing Protocols Configuration Guide: Release 6.2, Junos Internet Software for M-series and T-series Routing Platforms, www.juniper.net, Dec. 22, 2003.
Mark Bernard et al., Configuring Virtual Routers, JUNOSe Internet Software for E-series Routing Platforms System Basics Configuration Guide, Release 5.3.x, www.juniper.net, Jul. 1, 2004.
Rekhter, Y., RFC 1771, entitled A Border Gateway Protocol 4 (BGP-4), Mar. 1995, pp. 1-54.
Callon, R., RFC 1195, entitled Use of OSI ISIS for routing in TCP/IP and Dual Environments, Dec. 1990, pp. 1-73.
Moy, J., RFC 2328, entitled OSPF Version 2, Apr. 1998, pp. 1-142.

* cited by examiner

*Primary Examiner*—Moustafa M Meky
(74) *Attorney, Agent, or Firm*—Cesari and McKenna LLP (57) ABSTRACT

A virtual router (VR) communication arrangement enables services on different VRs executing on the same physical router to communicate without utilizing or substantially consuming communication resources, such as a network protocol stack and physical interfaces, of the physical router. The services are illustratively implemented as separately-scheduled VR processes executing on the physical router. A virtual router forwarding information base (vrFIB) is provided within a client socket library of each VR process and is used to determine whether the services are on the same physical router. If so, a lightweight interconnection is created between the services and a message ("packet") is forwarded over that interconnection to effectuate communication. If the services are not on the same physical router, the packet is sent over the network protocol stack and communication is established using the communication resources of the router.

23 Claims, 6 Drawing Sheets

COMMUNICATION ARRANGEMENT BETWEEN VIRTUAL ROUTERS OF A PHYSICAL ROUTER

FIELD OF THE INVENTION

The invention is directed to virtual router communication and, more specifically, to communication among services and/or processes of virtual routers executing on a physical router of a computer network.

BACKGROUND OF THE INVENTION

Communication in a computer network involves the exchange of information between two or more entities interconnected by communication links and subnetworks. These entities are typically software programs executing on hardware computer platforms, such as end nodes and intermediate nodes. An intermediate node, such as a router, interconnects the communication links and subnetworks to enable transmission of information between the end nodes. The nodes typically communicate by exchanging discrete packets or messages of information according to predefined protocols. In this context, a protocol consists of a set of rules defining how the nodes interact with each other.

A router is an intelligent intermediate node that comprises hardware elements, such as route and/or forwarding processors, memories, line cards and physical interfaces. A physical interface comprises the physical, electrical and mechanical interchange circuits, along with the software and data structures that allow the router to receive and transmit information over the network. The physical interface thus provides connectivity between users of the router and the network and, to that end, is a valuable resource to a purchaser of the router.

In addition to providing physical interfaces for a wide range of communication links and subnetworks, the router also implements network services, such as route processing, path determination and path switching functions. The route processing function allows the router to determine the type of routing needed for a packet, whereas the path switching function allows a router to accept a packet on one physical interface and forward it on a second interface. The path determination, or forwarding decision, function enables the router to select the most appropriate interface for forwarding a packet.

The router generally provides its network services through the execution of software modules, such as processes. A process is a software program that is defined by a memory address space. For example, an operating system of the router may be implemented as a single process with a large memory address space, wherein pieces of code within the process provide operating system services, such as process management. Yet, the router's network services may also be implemented as separately-scheduled processes in distinct, protected address spaces. These separate processes, each with its own process address space, execute on the router to manage resources internal to the router and, in the case of a database or routing protocol, to interact with users.

Services that are part of the same process address space communicate by accessing the same memory space. That is, information exchanged between services implemented in the same process address space is not transferred, but rather may be accessed in a common memory. However, communication among services that are implemented as separate processes is typically effected by the exchange of messages. For example, information exchanged between different addresses spaces of processes is transferred as one or messages between different memory spaces of the processes. A known message-passing mechanism provided by an operating system to transfer information between process address spaces is the Inter Process Communication (IPC) mechanism.

An application programming interface (API) is a set of software calls and routines that are made available (exported) by a process and that can be referenced by other processes. The services provided by the process are typically embodied as APIs. For example, services of a database process, such as lookup operations, queries and insertions, are provided via APIs that enable other processes to perform those operations.

Resources internal to the router may include communication resources that enable a process on one "physical" router to communicate over the network with another process on a different physical router. As used herein, a physical router comprises the hardware elements and software modules described above. The communication resources include the allocation of memory and data structures, such as packets, as well as a network protocol stack and physical interfaces of each router. The network protocol stack, in turn, comprises layers of software, such as a transport layer, an internetwork layer and a media (driver) layer. The Internet protocol (IP) is an internetwork layer protocol that provides network addressing between nodes, such as routers, whereas the transport layer provides a port service that identifies each process executing on the routers and creates a connection between those processes that indicate a willingness to communicate.

Transport layer services may be embodied as a socket interface comprising a client socket library (contained within each process) and a socket server of the network protocol stack. A process accesses the network protocol stack via the socket interface by creating a process message data structure that is passed to the socket server. The process message is typically embodied as information (data) "payload" appended to a transport header, the type of which depends on the transport layer protocol used by the process. Examples of conventional transport layer protocols include the Transmission Control Protocol (TCP), User Datagram Protocol (UDP) and Raw IP. The TCP transport service provides reliable delivery of a packet using a TCP transport header prepended to the packet, while the UDP service provides best efforts delivery using a UDP header. Raw IP denotes a process that does not use the transport provided by the socket interface, but directly interfaces to the IP layer of the network protocol stack.

Broadly stated, physical routers utilize communication resources, such as their network protocol stacks and physical interfaces, to enable communication among their processes by connecting those processes externally over the network. For example to establish communication with a receiving process on a destination router, a sending process executing on a source router constructs a process message using its socket library and passes it to the socket server (or transport layer) of the network protocol stack. The process message includes, inter alia, a destination network address of the destination router and a destination port number of the receiving process. The sending process passes that information as a connection request to its socket library to initialize a socket (i.e., open a virtual connection). The communication resources of the source and destination physical routers then establish communication between the processes.

To that end, the socket server also includes a library that is used to create a network layer (e.g., IP) header having, inter alia, source and destination network (IP) addresses. The socket server prepends the IP header to the transport header and passes that "packet" structure to the IP layer, which constructs a media access (MAC) header. The IP layer performs a lookup operation into a global forwarding information base (FIB) to determine an outgoing physical interface of the physical router. The global FIB includes a forwarding table that contains forwarding information, such as mappings of layer 3 (L3) network addresses to layer 2 (L2) MAC addresses and outgoing interfaces. Upon obtaining the proper outgoing interface, the IP layer prepends the MAC header to the packet and passes it to the media layer, which sends the packet over the network to the destination router.

At the destination router, each layer of the network protocol stack receiving the packet "unwinds" its respective header. For example, the headers prepended to the packet are stripped off, one-by-one, as the packet propagates up the layers of the network protocol stack until it arrives at the socket server of the stack. The socket server processes the packet to determine the port number of the receiving process and passes a process message to the client socket library internal to that process. The client socket then converts the process message into information that the receiving process understands. Thus, the communication resources of the physical routers cooperate to build a complete communication path that extends from the sending process, down the network protocol stack, through the physical interface of the source router and over the computer network to the physical interface of the destination router, up the network stack and to the receiving process.

A virtual router (VR) provides all of the services and functions of a physical router via software emulation. Typically, the physical router can support one or more VRs and, as such, each VR should appear as a separate physical router in the computer network, providing its services through the execution of processes. However, a VR is not a separate physical router; it shares both hardware and software resources of the physical router. Examples of resources shared (and assigned) among the VRs include physical interfaces that allow each VR to communicate with other routers. Virtual routers and their implementations are well-known and described in a white paper titled, *Virtual Routing for Provider Edge Applications*, IP Infusion Inc., San Jose, Calif. (2002), which paper is hereby incorporated by reference.

As noted, a sending process executing on a physical router may communicate externally over the computer network with a receiving process executing on another physical router using the communication resources of the routers. Similarly, a sending process executing on a VR of a source router may communicate externally with a receiving process executing on another VR of a destination router using the communication resources of each physical router. Moreover, processes of two separate VRs executing on the same physical router can communicate by coupling a physical wire (an external connection) to the physical interfaces assigned to each VR. Within the physical router, the communication resources described above are used to enable communication between the VR processes.

However, connecting the VR processes via an external connection is an expensive solution in that it consumes two physical interfaces of the physical router. If a physical router supports (implements) more than two VRs, additional physical interfaces may be consumed to enable communication among those VRs. Moreover, each external connection utilizes additional communication resources (memory, packets, network protocol stack) of the router. Accordingly, connectivity in a physical router configured to implement VRs is problematic; i.e., valuable communication resources (e.g., physical interfaces, etc.) may be consumed by the VRs, resulting in diminished connectivity (and saleability) of the physical router. The invention is directed to reducing the communication resources consumed by VRs implemented on a physical router to thereby increase connectivity of the router.

SUMMARY OF THE INVENTION

The present invention is directed to a virtual router (VR) communication arrangement that enables services on different VRs executing on the same physical router to communicate without utilizing or substantially consuming communication resources, such as a network protocol stack and physical interfaces, of the physical router. The services are illustratively implemented as separately-scheduled VR processes executing on the physical router. A virtual router forwarding information base (vrFIB) is provided within a client socket library of each VR process and is used to determine whether the services are on the same physical router. If so, a lightweight interconnection is created between the services and a message ("packet") is forwarded over that interconnection to effectuate communication. If the services are not on the same physical router, the packet is sent over the network protocol stack and communication is established using the communication resources of the router.

In the illustrative embodiment, the VR processes are routing protocol processes and the lightweight interconnection is preferably an Inter Process Communication (IPC) channel. Each VR has an internal logical or simulated "inter-VR" interface for configuring routing protocols. The vrFIB is associated with the inter-VR interface of each VR process that has indicated a willingness to communicate and, thus, contains a list of connected network addresses belonging to those willing processes. The client socket library of a VR process creates the lightweight interconnection (IPC channel) when another VR process indicates a willingness to communicate.

Operationally, two routing protocol processes P1 and P2 belonging to different virtual routers VR1 and VR2 on the same physical router may exchange information, e.g., control traffic, over the lightweight interconnection via client socket libraries of the processes. The control traffic is embodied as transport layer message (i.e., process message data structure) flow from P1 on VR1 to P2 on VR2. To that end, P1 initializes a socket with the destination network address of VR2 and other relevant information. The client socket library of P1 then performs a lookup operation of the destination address in its internal vrFIB. The vrFIB is located at the socket interface level in order to avoid using a global FIB that may be located on, e.g., line cards of the physical router. If the address is found, then forwarding is performed using the lightweight interconnection, e.g., a direct IPC channel bound to the destination address. A client socket library of P2 thereafter receives the process message from P1 and delivers it to P2.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
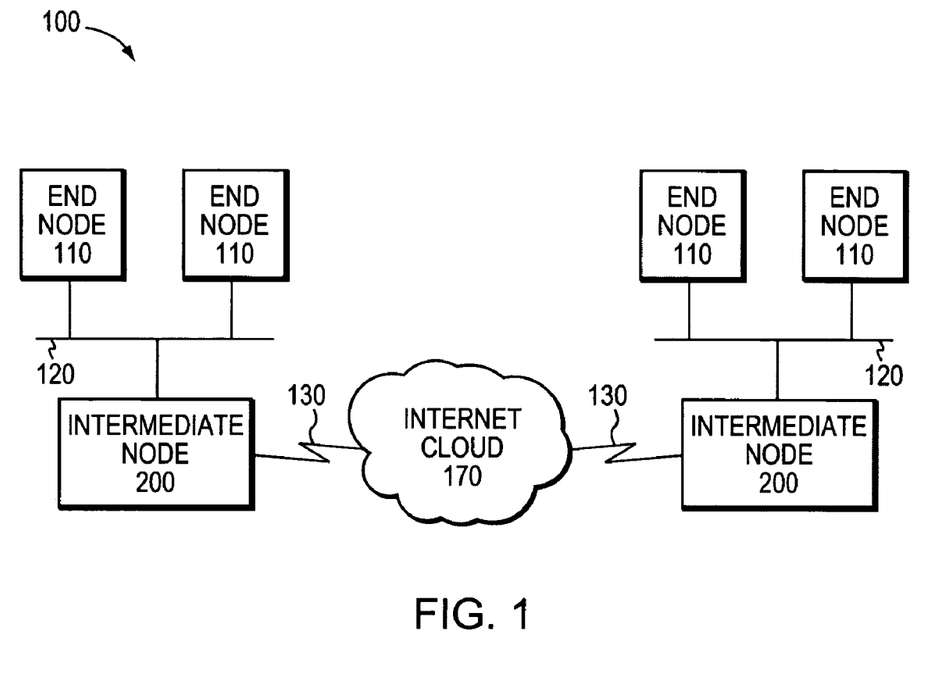
FIG. 1 is a schematic block diagram of a computer network that can be advantageously used with the present invention.

FIG. 1 is a schematic block diagram of a computer network 100 that can be advantageously used with the present invention. The computer network 100 comprises a collection of communication links and subnetworks connected to a plurality of nodes, such as end nodes 110 and intermediate nodes 200. The links and subnetworks may comprise local area networks (LANs) 120, wide area networks (WANs) within Internet cloud 170 and WAN links 130 interconnected by intermediate nodes 200, such as routers, to form a network of computer nodes. The nodes communicate by exchanging data packets according to a predefined set of protocols, such as the Transmission Control Protocol/Internet Protocol (TCP/IP).

Figure 2:
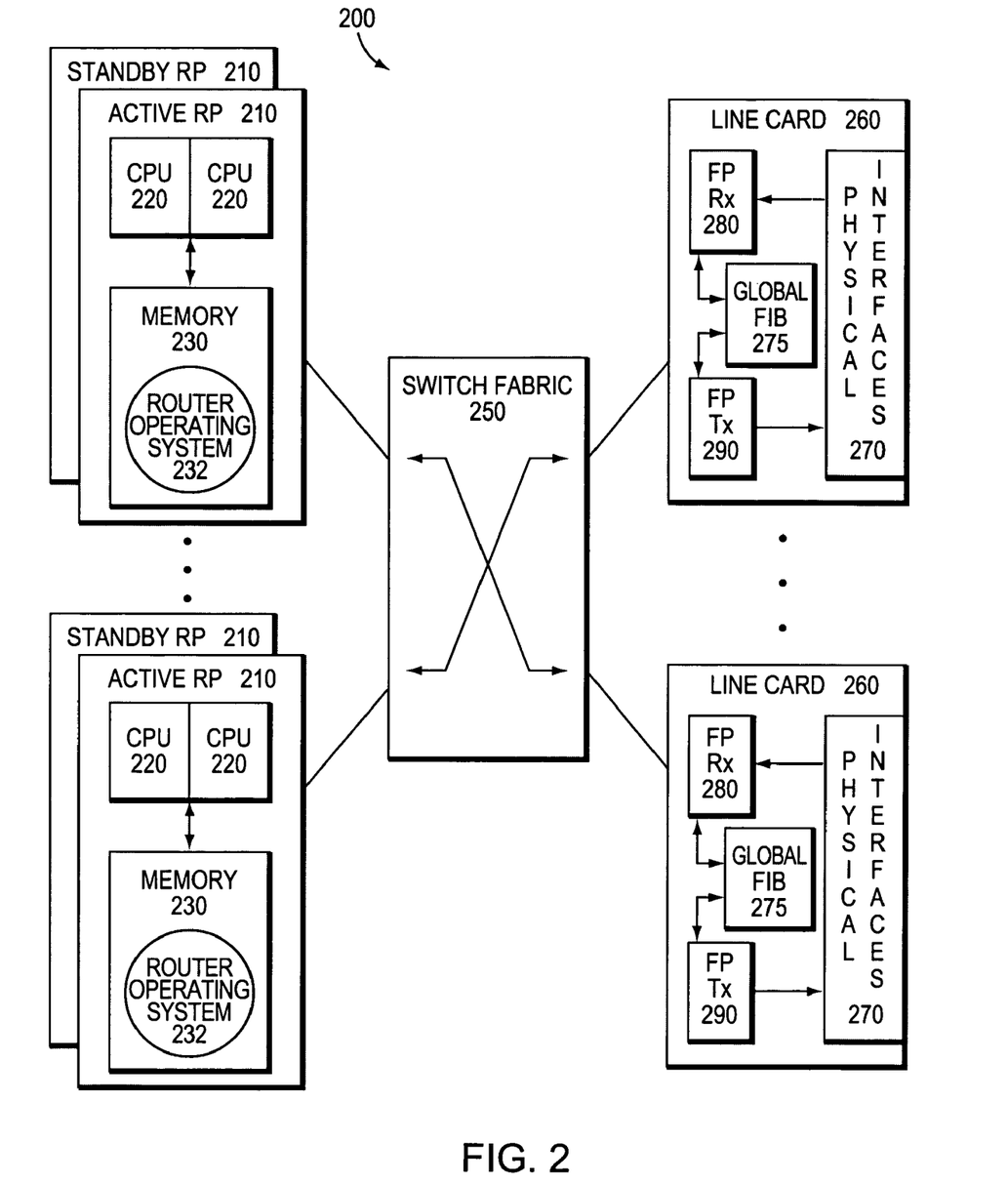
FIG. 2 is a schematic block diagram of an embodiment of a router that may be advantageously used with the present invention.

FIG. 2 is a schematic block diagram of an intermediate node, such as a physical router 200, which may be advantageously used with the present invention. The router 200 comprises a plurality of loosely coupled processors 210 connected to a plurality of ingress and egress line cards (line cards 260) via a switch fabric 250 such as, e.g., a crossbar interconnection or high-speed bus. Those skilled in the art will recognize that other physical router platforms such as, e.g., a uniprocessor system or a plurality of independent processor complexes interconnected via a communications fabric, could be used in accordance with the invention. In this context, the term "processor complex" denotes a computer comprising processors and an independent memory shared by the processors.

The processors 210 are illustratively route processors (RP) configured as active and standby RP pairs, with each processor having a dedicated memory 230. The memory 230 may comprise storage locations addressable by the processor for storing software programs and data structures associated with the invention. The processor 210 may comprise processing elements or logic for executing the software programs and manipulating the data structures. A router operating system 232, portions of which are typically resident in memory 230 and executed by the processor, functionally organizes the physical router by, inter alia, invoking network operations in support of software modules/processes (described herein) executing on the processor. It will be apparent to those skilled in the art that other processor and memory means, including various computer readable media, may be used for storing and executing program instructions pertaining to the invention described herein.

In the illustrative embodiment, the line cards perform forwarding of the data traffic, while the route processors handle routing and control of the data traffic forwarding (via, e.g., control traffic). Each route processor comprises two central processing units (CPUs 220) configured as a symmetric multiprocessing (SMP) pair. The CPU SMP pair is adapted to run a single copy of the router operating system 232 and access its memory space 230. Each line card 260 comprises a plurality of physical interfaces 270 coupled to a receive forwarding processor (FP Rx 280) and a transmit forwarding processor (FP Tx 290). Each physical interface comprises the physical, electrical and mechanical interchange circuits, along with the software and data structures that allow the router to receive and transmit information over the network. The physical interface 270 thus provides connectivity between users of the router and the network 100.

The FP Rx 280 renders a forwarding decision for each packet received at the router on an ingress interface of an ingress line card in order to determine where to forward the packet. To that end, the FP Rx makes use of a global forwarding information base (FIB) 275, described further herein. In the event that the packet is to be forwarded to one of the router's route processors, the FP Rx makes use of an internal FIB, IFIB, to determine to which route processor the packet should be forwarded. Likewise, the FP Tx 290 performs lookup operations (using global FIB 275) on a packet transmitted from the router via one or more egress interfaces of an egress line card.

The physical router 200 provides network services through the execution of software modules, such as processes. In the illustrative embodiment, these services are implemented as separately-scheduled processes. These processes, each with its own process address space, execute on the router to manage resources internal to the router and, in the case of a routing protocol, to interact with users. The physical router 200 also supports a plurality of virtual routers (VRs), wherein each VR provides all of the services and functions of the physical router via software emulation. As such, each VR should appear as a separate physical router in the computer network 100, providing its services through the execution of processes. However, a VR is not a separate physical router; it shares both hardware and software resources of the physical router.

Examples of resources shared among the VRs are communication resources that enable each VR to communicate with other routers. As used herein, the communication resources include the allocation of memory and data structures, such as packets, as well as a network protocol stack and physical interfaces 270 of the physical router. As for the latter, each VR is assigned one or more physical interfaces. The VR is identified by a (source) network address that is defined as either the unique network address of a physical interface 270 assigned to the VR or an identifier (ID), such as a router ID, of the physical router 200. The ID is a general ID for the physical router that an interface may assume; it is customary for the ID to be used instead of an interface network address.

Figure 3:
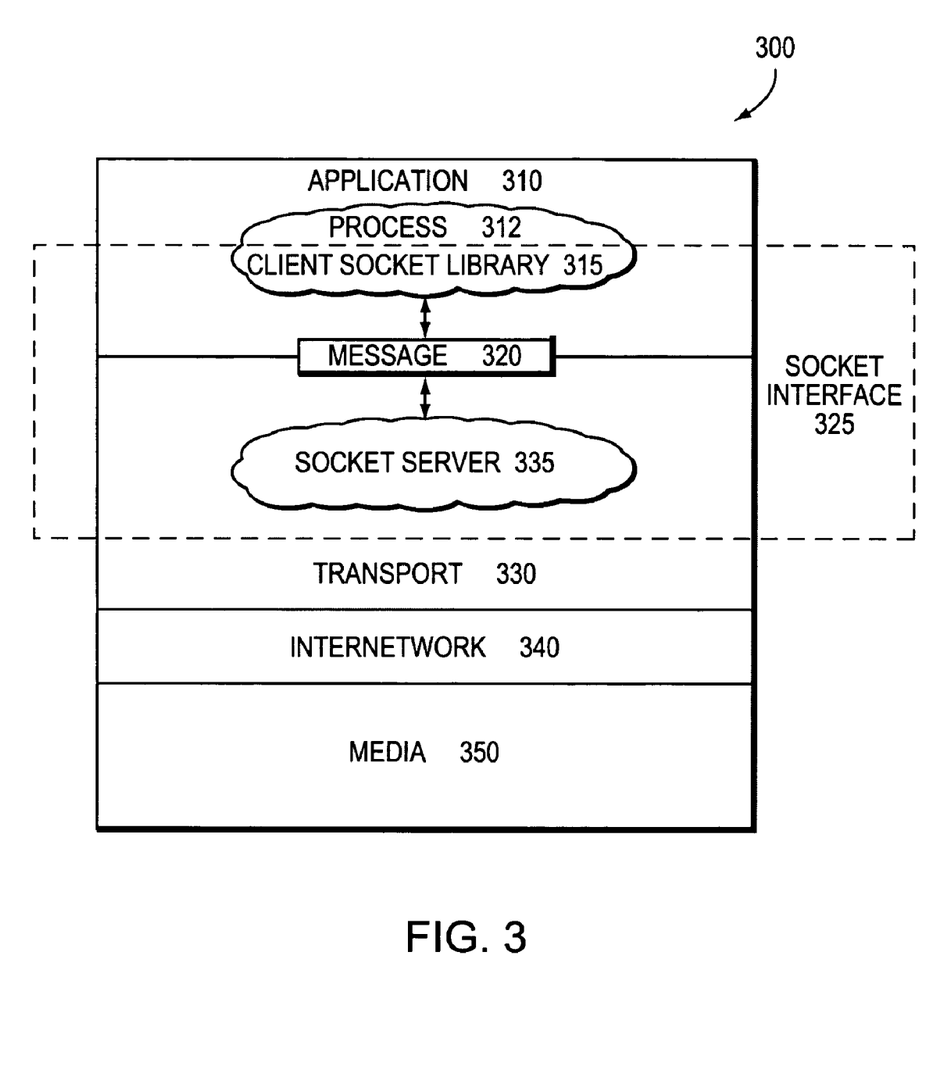
FIG. 3 is a schematic block diagram of a conventional network protocol stack that may be advantageously used with the present invention.

FIG. 3 is a schematic block diagram of a conventional network protocol stack 300, such as the Internet communications protocol stack, that may be advantageously used with the present invention. The architecture of the network protocol stack is generally represented by four layers termed, in ascending interfacing order, the media (driver) layer 350, the internetwork layer 340, the transport layer 330 and the application layer 310.

The application layer 310 includes one or more separately-scheduled processes 312, such as routing protocol processes, executing on the router 200. Examples of well-known routing protocol processes include the Border Gateway Protocol (BGP) described in *Request For Comments (RFC)* 1771, by Y. Rekhter and T. Li (1995), and the Open Shortest Path First (OSPF) protocol described in *RFC* 2328, *OSPF version 2*, by J. Moy (1998).

The Internet protocol (IP) is an internetwork layer protocol that provides network addressing between nodes, such as routers. IP is primarily a connectionless protocol that provides for internetwork routing, fragmentation and assembly of exchanged packets, and that relies on transport protocols for end-to-end reliability and other service characteristics. An example of a transport protocol is the TCP protocol, which is implemented by the transport layer 330 and provides connection-oriented, end-to-end reliability services to the upper layer protocols of the protocol stack. Examples of other transport protocols include the User Datagram Protocol (UDP), which provides best efforts delivery, and Raw IP. Raw IP denotes a process that does not use a transport, but directly interfaces to the internetwork layer 340 of the network protocol stack 300. A process that utilizes Raw IP must identify itself uniquely within the physical router.

Broadly stated, the transport layer 330 provides a port service that identifies each process executing on the routers and creates a connection between those processes that indicate a willingness to communicate. This transport layer service may be embodied as a socket interface 325 comprising a client socket library 315 (created within the process address space of process 312) and a socket server 335 of the network protocol stack 300. Process 312 accesses the network protocol stack 300 via the socket interface 325 by creating a process message data structure ("message") that is exchanged with the socket server 335. The message 320 is typically embodied as information (data) "payload" appended to a transport header, the type of which depends on the transport layer protocol used by the process.

The client socket library 315 thus cooperates with the socket server 335 to provide the service needed for a process 312 to communicate over the network protocol stack 300. In order to use/access the service of the socket server 335, application programming interfaces (APIs) are required. That is, a process 312 may access the socket server 335 via APIs complied by its client socket library 315. Examples of APIs (or function calls) include create_socket, and open_socket. The process issues these function calls to the client socket library, which implements those calls to effectuate communication.

Communication among services that are implemented as separately-executable processes is typically effected by the exchange of messages. A known message-passing mechanism provided by router operating system 232 to transfer information between processes (and process address spaces) is the Inter Process Communication (IPC) mechanism. An example of router operating system 232 having associated protocol services implemented as separately-scheduled processes and that may be advantageously used with the present invention is the IOS-XR operating system available from Cisco Systems, Inc. However, any operating system that uses sockets as a basis for IPC and/or network communication, such as the UNIX operating system, may also be used with the present invention.

The router operating system 232 typically provides an IPC mechanism comprising APIs and messages that create a "channel" between two processes of router 200 that indicate a willingness to communicate. In an illustrative embodiment, creation of the channel requires knowledge of a pathname of a receiving process (e.g., P2) by a sending process (e.g., P1); illustratively, such knowledge is obtained through system (pre-programmed) configuration. To utilize the IPC mechanism, P2 exports ("publishes") its pathname (e.g., /P2) in a well-known directory; P1 uses that pathname to communicate with P2. P1 then invokes code to open a channel or virtual connection, i.e., initialize a "socket", between P1 and P2. In response, P2 returns a file descriptor (fd) to P1, e.g., fd=open ("/P2"), which is used by P1 to access the socket. Once established, the socket/virtual connection provide a message passing mechanism that utilizes APIs, such as send_message and receive_message, to send and receive information as messages exchanged among the processes.

As noted, processes of two different VRs executing on physical router 200 can communicate by coupling a physical wire (an external connection) to the physical interfaces 270 assigned to the VRs. Within the physical router, the communication resources described above are used to enable communication between the VR processes. However, connecting the VR processes via an external connection is an expensive solution in that it consumes two physical interfaces 270 of the router 200, which results in diminished connectivity of the router. The invention is directed to reducing the communication resources consumed by VRs implemented on a physical router to thereby increase connectivity of the router.

Specifically, the present invention is directed to a VR communication arrangement that enables services on different VRs executing on the same physical router to communicate without utilizing or substantially consuming communication resources, such as a network protocol stack and physical interfaces, of the physical router. The services are illustratively implemented as separately-scheduled VR processes executing on the physical router. A virtual router forwarding information base (vrFIB) is provided within a client socket library of each VR process and is used to determine whether the services are on the same physical router. If so, a lightweight interconnection is created between the services and a message ("packet") is forwarded over that interconnection to effectuate communication. If the services are not on the same physical router, the packet is sent over the network protocol stack and communication is established using the communication resources of the router.

Figure 4:
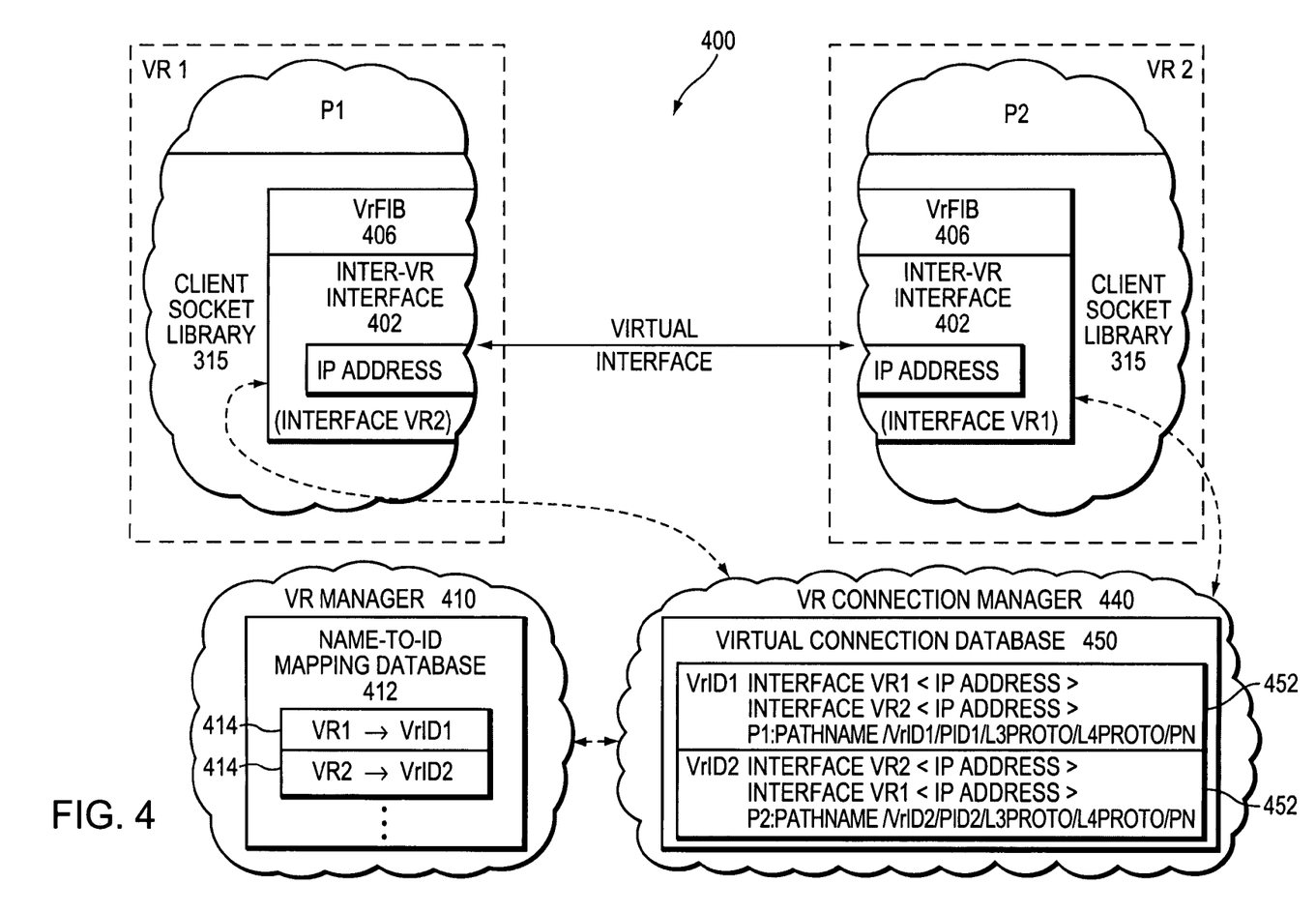
FIG. 4 is a schematic block diagram illustrating various processes and data structures that may be advantageously used with the present invention.

FIG. 4 is a schematic block diagram illustrating various processes and data structures that may be advantageously used with the present invention. A plurality of VRs, e.g., VR1 and VR2, each with a respective VR process, e.g., P1 and P2, execute on a physical router, such as router 200. Each VR is assigned a VR identifier (VrID), e.g., VrID1 and VrID2, which is stored in a respective entry 414 of a "Name-to-ID" mapping database 412 that is maintained by a VR manager module 410. Each VR has an internal logical or simulated "inter-VR" interface 402 that is created in a client socket library 315 of each VR process, e.g., a routing protocol, as described herein. Each inter-VR interface 402 is illustratively created in response to a user interface command (e.g., connect <VR1> <VR2>) issued by a system administrator to establish a connection between the two VRs (and, more specifically, processes of the VRs) indicating a willingness to communicate.

A vrFIB 406 is constructed in each client socket library 315 of each process once the inter-VR interface 402 is created between each VR indicating a willingness to communicate. The system administrator of the physical router 200 creates each inter-VR interface 402 so that it can be "viewed" on each VR. Illustratively, the inter-VR interface on one VR bears the name of the other VR willing to communicate. For example, the inter-VR interface on VR1 is designated "interface VR2" and the inter-VR interface on VR2 is designated "interface VR1". Once the inter-VR interfaces are created, users of each VR can configure network (IP) addresses and other attributes.

A goal of the present invention is to implement modifications to the conventional IPC mechanism and client socket library in a manner that is transparent to the processes (routing protocols) and users of the router 200. Furthermore, by configuring the routing protocol process on each inter-VR interface 402, the vrFIB 406 can be constructed in the same way as the global FIB 275. Instead of containing layer 2 adjacency information (outgoing interface and MAC address), entries of the vrFIB 406 contain identification of the lightweight interconnections (IPC channels). Each lightweight interconnection may be identified by a process handle or file descriptor, wherein the file descriptor illustratively and uniquely maps to a pathname. The client socket library 315 of a VR process (e.g., P1) creates the lightweight interconnection when another VR process (e.g., P2) indicates a willingness to communicate.

A VR connection manager module 440 facilitates establishment of the connection between the processes executing on the VRs. To that end, the VR connection manager maintains a virtual connection database 450 having a one or more entries 452 configured to hold information exchanged among those processes. In response to the connect command, the VR connection manager 440 is invoked to obtain information needed to establish the connection. Illustratively, the connection manager 450 uses the names of the VRs (e.g., VR1 and VR2) to obtain their IDs (e.g., VrID1 and VrID2) from the mapping database 410. Upon obtaining each VrID, the VR connection manager initializes (constructs) an entry 452 of the database 450 that includes identification of the inter-VR interfaces (interface VR1 and interface VR2) of the communicating VRs. Each entry 452 is indexed in the database 450 by the VrID.

Once the inter-VR interface is created, a user of the VR can "see" that interface 402. Accordingly, the user may issue a user interface command to configure (assign) a network (IP) address to its inter-VR interface 402. The VR connection manager 440 then inserts the assigned IP address into the appropriate database entry 452. According to an aspect of the invention, the contents of each entry 452 essentially comprise the vrFIB 406 that is created by the VR connection manager for each inter-VR interface 402 in its database 450. Thereafter, when processes on the VRs indicate a willingness to communicate, the VR connection manager 440 copies the contents of the appropriate database entries 452 into the respective vrFIBs 406 within the client socket libraries 315 of those processes.

According to another aspect of the invention, the simulated inter-VR interface 402 is used to, among other things, configure protocols. A protocol, such as a routing protocol, is typically configured on an interface, such as physical interface 270 of physical router 200, to communicate with peer protocol processes (peers) connected to that interface. To that end, the routing protocol is configured on the interface to acquire (discover) network and layer 2 (MAC) addresses of neighboring routers (adjacencies) connected to that interface. Examples of protocols used to acquire layer 2 MAC addresses and layer 3 network addresses are the well-known address resolution protocol (ARP) and interior gateway protocols (IGP), respectively. The network addresses acquired by the IGP "routing" protocols are used to construct an adjacency table, whereas the network and MAC addresses are associated with forwarding information needed to build a FIB, such as global FIB 275. Examples of IGP routing protocols include link-state routing protocols, such as the well-known Intermediate-System-to-Intermediate-System (IS-IS) and, illustratively, the OSPF protocols.

Figure 5:
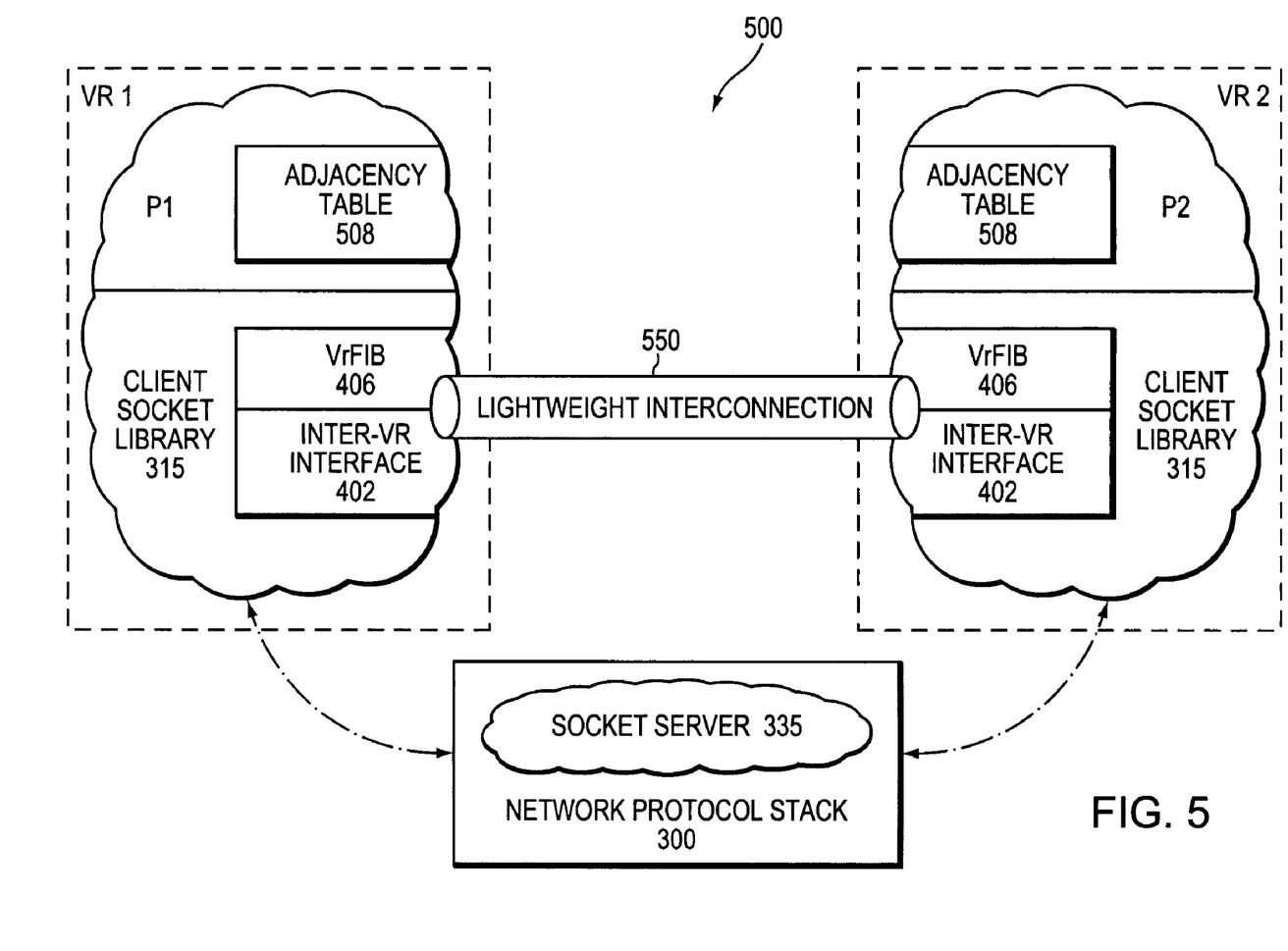
FIG. 5 is a schematic block diagram illustrating a virtual router (VR) communication arrangement according to the present invention.

FIG. 5 is a schematic block diagram illustrating the VR communication arrangement according to the present invention. As noted, each VR has an internal inter-VR interface 402 that is created in a client socket library 315 of each VR process. An example of the client socket library 315 is a "libsocket.dll" of the UNIX operating system; the present invention modifies the libsocket.dll without modifying the VR process code. Illustratively, upon recognizing that two processes are on the same physical router, the libsocket.dll (client socket library 315) is modified to use lightweight interconnection 550 rather than the network protocol stack 300, thus obviating the use of the socket server 335.

In the illustrative embodiment, the VR processes are routing protocol processes, such as BGP and OSPF, and the lightweight interconnection is preferably an IPC channel. Notably, the present invention does not alter the way these routing protocols communicate. Rather, the invention obviates the use of communication resources, such as the socket server and other layers of the network protocol stack, when the routing protocols are on the same physical router and in a manner that is transparent to the protocol processes. To that end, the present invention modifies the conventional IPC mechanism to allow automatic (dynamic) creation of an IPC channel.

Assume that the processes P1 and P2 are peer processes of a routing protocol, such as BGP or OSPF, executing on VR1 and VR2. The routing protocol is configured on the inter-VR interfaces 402, similar to the way the protocol is configured on physical interface 270. Note that the routing protocol is illustratively configured on all inter-VR interfaces 402 of the physical router 200. Once configured, the routing protocol can transmit routing information to, and receive routing information from, peer routing protocols on VRs that indicate a willingness to communicate. The information is then used to construct adjacency table 508 and vrFIB 406 to thereby enable the routing protocol to communicate with the peer routing protocol processes.

For example, P1 is configured on its inter-VR interface 402 and, to that end, sends and listens on that interface to acquire address information from its peer P2, which has indicated a willingness to communicate. In communicating, P1 may take on two distinct roles—sending and listening. When listening, P1 identifies the packets it listens for according to some well-known criteria that may include, e.g., the layer 3 (L3) protocol (examples of which include IPv4, IPv6 and OSI), the layer 4 (L4) protocol (examples of which include TCP, UDP and OSPF) and the transport-layer port number, if applicable. When sending, P1's packets may be described according to the same criteria, or the packets may differ in some respect. Specifically, in protocols based on the TCP transport-layer protocol, the port number of one end of the communication may be a well-known port number, but the other end of communication may use a randomly chosen port number.

Subsequent to being configured on its inter-VR interface 402 and when operating in its listening role, P1 creates a pathname so that P2 can attach to that pathname. To create its pathname, P1 identifies the criteria it uses to identify packets it wishes to receive, according to the specifics of the protocol, by calling its client socket library 315 with a socket API that specifies the criteria. The client socket library then uses the criteria to create a unique pathname for P1. According to yet another aspect of the invention, the unique pathname comprises the concatenation of (i) an ID of the VR (VrIDx), (ii) an ID of the process (PIDx) executing on the VR, (iii) the L3 protocol, (iv) the L4 protocol and, optionally, (v) the L4 port number (PN) to which the process binds, e.g., /VrID1/PID1/IPv4/OSPF. Note that the client socket library 315 obtains the VrIDx and PIDx values using operating system calls in a conventional manner. By creating a different pathname that is distinguishable by process ID, a different process on the same VR can send and listen for the same packets.

Upon creation, the pathname is provided by the client socket library 315 to the VR connection manager 440 for "publishing" in a directory well-known to the VRs. In the illustrative embodiment, the well-known directory is the virtual connection database 450 and, in particular, an entry 452 of the database indexed by VrID. In response to receiving the pathname of a process, the VR connection manager copies the contents of the entry 452 into the vrFIB 406 in the client socket library 315 of that process. For example, the manager 440 copies the contents of the entry 452 (e.g., interface VR1<ip address>, interface VR2<ip address>) indexed by VrID (e.g., VrID1) into vrFIB 406 of P1's client socket library.

Meanwhile, P2 is configured to run on its inter-VR interface 402 and identifies the criteria it uses to communicate with P1. As described above, this procedure creates a pathname (e.g., /VrID2/PID2/IPv4/OSPF) and loads that pathname into entry 452 of virtual connection database 450 indexed by VrID2. The VR connection manager then copies the contents of the entry 452 into the vrFIB 406 of P2's client socket library. Furthermore, upon recognizing the P2 has indicated a willingness to communicate with P1, the VR connection manager 440 provides P1's unique pathname (/VrID1/PID1/IPv4/OSPF) to P2 so that P2 can attach (connect) to that pathname.

Figure 6:
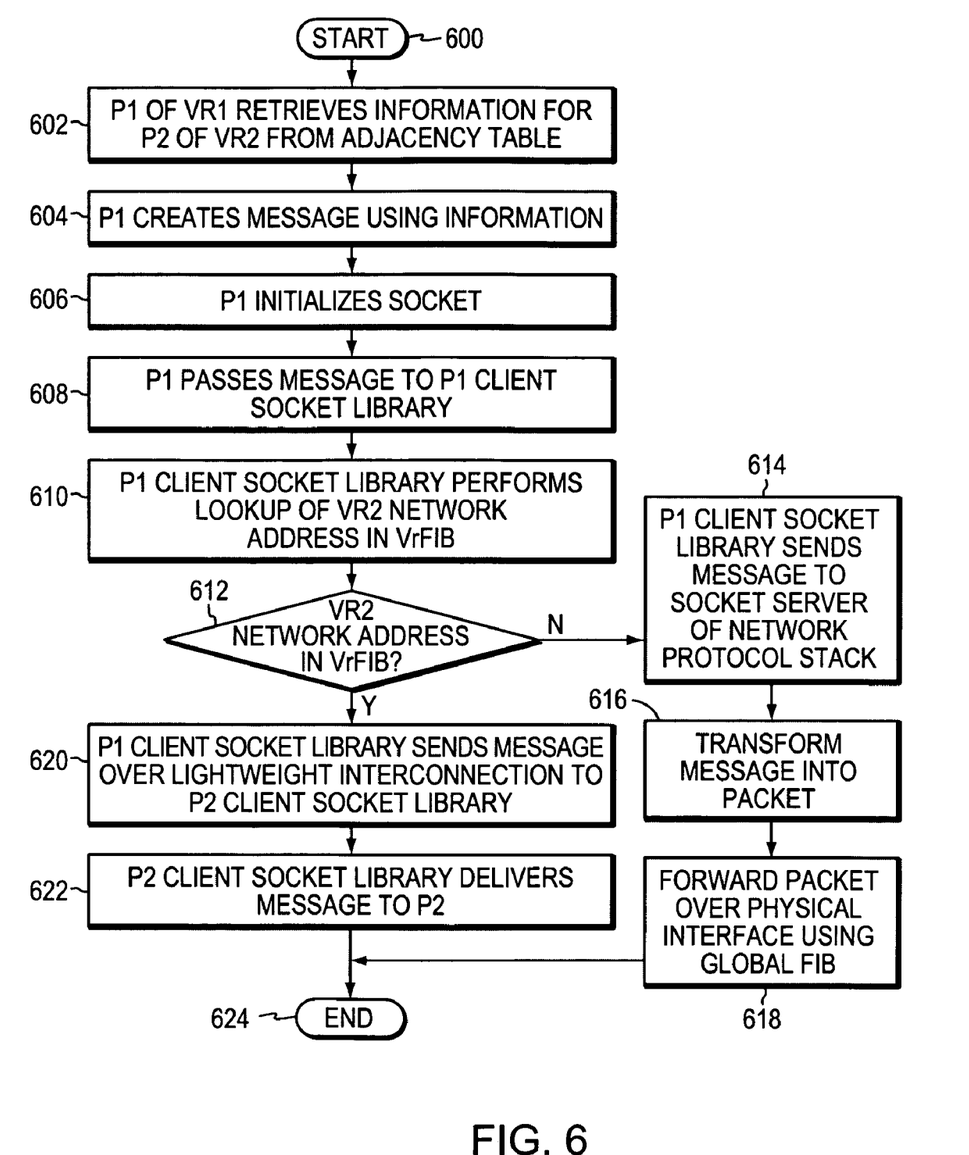
FIG. 6 is a flowchart illustrating a procedure for implementing the VR communication arrangement in accordance with the present invention.

FIG. 6 is a flowchart illustrating a procedure for implementing the VR communication arrangement in accordance with the present invention. Assume two VR processes, e.g., P1 and P2, belonging to different VRs (VR1 and VR2) want to communicate by exchanging information, e.g., control traffic. The procedure starts at Step 600 and proceeds to Step 602 where sending process (P1) retrieves relevant information for receiving process (P2) from its adjacency table 508. In Step 604, P1 creates a process message data structure (message 320) using that information. The control traffic is illustratively embodied as transport layer message flow from P1 to P2.

To implement such transport layer (e.g., including, but not limited to, TCP, UDP or Raw IP) message flow, P1 initializes a socket with the destination network address of VR2 and other relevant information (Step 606). For example, P1 uses a socket API (e.g., open_socket) and loads the information into the message 320. Illustratively, the message 320 contains a destination network address of the destination VR (VR2), a destination port number of the receiving process (P2), a source network address of the source VR (VR1), a source port number of the sending process (P1) and any "payload" data (e.g., control traffic information). In Step 608, P1 passes the message 320 to its client socket library 315.

In Step 610, the client socket library 315 performs a look up operation of VR2's destination network address in its internal vrFIB 406. As noted, the vrFIB is internal to the client socket library and contains the network (e.g., IP) addresses of other VR processes that have indicated a willingness to communicate. If the communication resources of the physical router were to be used, the lookup operation would occur at the global FIB 275 to determine the outgoing physical interface 270 of the router 200. The vrFIB 406 is located at the socket interface 325 in order to avoid using the global FIB 275 that may be located on, e.g., line cards 260 of the physical router 200. Notably, the lookup operation occurs in the vrFIB 406 transparent to P1 and in response to initialization of the socket.

In Step 612, a determination is made as to whether the VR2's destination address is found in the vrFIB. A determination that a destination network address is not in the vrFIB denotes that the two processes are not on the same physical router 200. If VR2's destination address is not found in the vrFIB, the P1 client socket library 315 sends the message to the socket server 335 (transport layer) and onto the network protocol stack (Step 614). In Step 616, the message is transformed into a packet and, in Step 618, forwarded over an outgoing physical interface 270 of the router using the global FIB 275. The sequence then ends at Step 624.

However, if VR2's destination address is found in the vrFIB (Step 610), then forwarding is performed over the lightweight interconnection via the client socket libraries of the processes, e.g., via a direct IPC channel bound to the VR2 destination address. Specifically, the P1 client socket library 315 sends the message over the lightweight interconnection 550 (e.g., an IPC channel) to the client socket library 315 of receiving process P2 (Step 620). Illustratively, the client socket library 315 forwards the message over the lightweight interconnection by invoking the API "msg send (fd, process message data structure)". In Step 622, the P2 client socket library 315 delivers the message 320 to P2. Notably, from its point of view, the P2 client socket library 315 receives the same message (process message data structure) as would be delivered from the socket server 335 of the network protocol stack 300. The procedure then ends at Step 624. Thus, discovery of the destination network address in the vrFIB 406 denotes that the two processes are on the same physical router 200; accordingly, the lightweight interconnection 550 is used to forward the message 320 between the processes, thereby obviating substantial processing and consumption of communication resources on the router 200.

While there has been shown and described an illustrative embodiment that enables services on different VRs executing on the same physical router to communicate without utilizing or substantially consuming communication resources of the router, it is to be understood that various other adaptations and modifications may be made within the spirit and scope of the present invention. For example, in an alternate embodiment of the invention, the services described herein may be implemented within a single operating system process executing on the physical router. In this case, the lightweight interconnection 550 may be embodied as one or more direct function calls between the services.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for enabling services on different virtual routers executing on a same physical router to communicate without substantially consuming communication resources of the physical router, the method comprising the steps of:

determining whether the services are on the same physical router using a virtual router forwarding information base of each virtual router;

if the services are on the same physical router, creating a lightweight interconnection between the services via a socket library of each of the services; and forwarding a message using the socket library of a first of the services, over the lightweight interconnection, for receipt using the socket library of a second of the services, to enable communication between the services, thereby obviating substantial consumption of the communication resources.

2. The method of claim 1 wherein the services are separately-scheduled processes in distinct, protected address spaces executing on the physical router.

3. The method of claim 2 wherein the lightweight interconnection is an inter process communication channel.

4. The method of claim 1 wherein the services are part of a router operating system executing on the physical router.

5. The method of claim 4 wherein the lightweight interconnection is one or more function calls between the services.

6. A system configured to enable processes on different virtual routers executing on a same physical router to communicate without substantially consuming communication resources of the physical router, the system comprising:
   a processor;
   a router operating system executed by the processor and adapted to functionally organize the physical router by invoking network operations in support of the processes executed by the processor, the processes being independent of the router operating system;
   a virtual router forwarding information base (vrFIB) of each process, the vrFIB used to determine whether the processes are on the same physical router; and
   a lightweight interconnection established via a socket library of each of the processes and used for communication between the processes when the processes are on the same physical router, thereby obviating substantial consumption of the communication resources.

7. The system of claim 6 wherein the socket library is a a client socket library, and the client socket library is configured to create the lightweight interconnection.

8. The system of claim 7 wherein the lightweight interconnection is an inter process communication channel.

9. The system of claim 8 further comprising an inter-VR interface of each process, the inter-VR interface adapted to configure routing protocols.

10. The system of claim 9 wherein the vrFIB is associated with the inter-VR interface and contains a list of connected network addresses belonging to processes indicating a willingness to communicate.

11. The system of claim 7 wherein the processes are routing protocols configured to exchange control traffic over the lightweight interconnection via the client socket libraries of the processes.

12. The system of claim 11 wherein the control traffic is embodied as transport layer message flow from one routing protocol to another routing protocol.

13. The system of claim 12 wherein the communication resources comprise a network protocol stack and physical interfaces of the physical router.

14. Apparatus adapted to enable services on different virtual routers executing on a same physical router to communicate without substantially consuming communication resources of the physical router, the apparatus comprising:
   means for determining whether the services of the virtual routers are on the same physical router;
   means for creating a lightweight interconnection between the services via a socket library of each of the services, if the services are on the same physical router; and
   means for forwarding a message using the socket library of a first of the services, over the lightweight interconnection, for receipt using the socket library of a second of the services, to enable communication between the services, thereby obviating substantial consumption of the communication resources.

15. The apparatus of claim 14 wherein the services are processes independent of a router operating system executing on the physical router.

16. The apparatus of claim 15 wherein the lightweight interconnection is an inter process communication channel.

17. The apparatus of claim 14 wherein the services are part of a router operating system executing on the physical router.

18. The apparatus of claim 17 wherein the lightweight interconnection is one or more direct function calls between the services.

19. A computer readable medium containing executable program instructions for enabling services on different virtual routers executing on a same physical router to communicate without substantially consuming communication resources of the physical router, the executable program instructions comprising program instructions for:
   determining whether the services of the virtual routers are on the same physical router;
   if the services are on the same physical router, creating a lightweight interconnection between the services via a socket library of each of the services; and
   forwarding a message using the socket library of a first of the services, over the lightweight interconnection, for receipt using the socket library of a second of the services, to enable communication between the services, thereby obviating substantial consumption of the communication resources.

20. The computer readable medium of claim 19 wherein the services are processes independent of a router operating system executing on the physical router.

21. The computer readable medium of claim 20 wherein the lightweight interconnection is an inter process communication channel.

22. The computer readable medium of claim 19 wherein the services are part of a router operating system executing on the physical router.

23. The computer readable medium of claim 22 wherein the lightweight interconnection is one or more function calls between the services.

* * * * *